(12) United States Patent
Costa

(10) Patent No.: US 12,361,480 B1
(45) Date of Patent: Jul. 15, 2025

(54) SYSTEM AND METHOD FOR FINANCIAL HEALTH ROBO-ADVISOR

(71) Applicant: Wells Fargo Bank, N.A., San Francisco, CA (US)

(72) Inventor: Cathy Ann Costa, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/054,300

(22) Filed: Nov. 10, 2022

(51) Int. Cl.
*G06Q 40/00* (2023.01)
*G06Q 40/02* (2023.01)

(52) U.S. Cl.
CPC .................... *G06Q 40/02* (2013.01)

(58) Field of Classification Search
CPC .................................................. G06Q 40/02
USPC ............................................................ 705/35
See application file for complete search history.

(56) References Cited

U.S. PATENT DOCUMENTS

| | | | |
|---|---|---|---|
| 10,192,265 B2 | 1/2019 | Carragher | |
| 10,943,308 B1 | 3/2021 | Brandt et al. | |
| 11,392,918 B1* | 7/2022 | Jamison | G06Q 40/00 |
| 2010/0306126 A1* | 12/2010 | Moran | G06Q 40/06 |
| | | | 705/36 R |
| 2012/0197818 A1* | 8/2012 | Moran | G06Q 40/00 |
| | | | 705/36 R |
| 2019/0287044 A1 | 9/2019 | Mantel et al. | |
| 2020/0265356 A1 | 8/2020 | Lee et al. | |
| 2021/0090173 A1 | 3/2021 | Steffes | |
| 2021/0165697 A1 | 6/2021 | Gopalan et al. | |
| 2021/0264521 A1 | 8/2021 | Lee et al. | |

(Continued)

FOREIGN PATENT DOCUMENTS

| | | |
|---|---|---|
| JP | 2018067184 A | 4/2018 |
| KR | 101812222 B1 | 12/2017 |

(Continued)

OTHER PUBLICATIONS

"Ally-Robo Portfolios", [Online]. Retrieved from the Internet: <URL: https://www.ally.com/invest/robo-automated-investing/>, (Jun. 1, 2022), 9 pgs.

(Continued)

*Primary Examiner* — Hai Tran
(74) *Attorney, Agent, or Firm* — SCHWEGMAN LUNDBERG & WOESSNER, P.A.

(57) ABSTRACT

Aspects of the present disclosure address systems and methods for receiving, via a processor, a financial health goal from a user and for retrieving, from a data store, one or more financial health templates based on the financial health goal. The financial health goal does not include an investment goal. The systems and methods additionally include retrieving, from a data store, one or more financial health templates based on the financial health goal, wherein each of the one or more financial health templates comprise a trained model. The systems and methods also include deriving, via the processor, a financial health advice action based on using the financial health goal as input to the trained model of the one or more financial health templates, and providing the financial health advice, wherein the one or more financial health templates are created based on consumer financial data.

15 Claims, 6 Drawing Sheets

(56) References Cited

U.S. PATENT DOCUMENTS

2022/0028001 A1    1/2022    Wachell et al.
2022/0092627 A1    3/2022    Woodrick et al.

FOREIGN PATENT DOCUMENTS

KR    20200001189 A    1/2020
KR    20200055832 A    5/2020

OTHER PUBLICATIONS

"Arthos", [Online]. Retrieved from the Internet: <URL: https://www.arthayantra.com>, (May 31, 2022), 9 pgs.

"Digit", [Online]. Retrieved from the Internet: <URL: https://digit.co/spend>, (Jun. 2, 2022), 13 pgs.

"Robo-advisors and Artificial Intelligence—Personal Capital", [Online]. Retrieved from the Internet: <URL: http://emerg.com/ai-application-comparisons/robo-advisors-artificial-intelligence-comparing-5-current-apps/>, (Jun. 3, 2022), 17 pgs.

Bataev, Alexey V, et al., "Innovations in the Financial Sphere: Performance Evaluation of Introducing Service Robots with Artificial Intelligence", IEEE 2020 9th International Conference on Industrial Technology and Management, (Feb. 2020), 5 pgs.

\* cited by examiner

SYSTEM AND METHOD FOR FINANCIAL HEALTH ROBO-ADVISOR

TECHNICAL FIELD

The present disclosure generally relates to automated advising, and more specifically to financial health automated advising.

BACKGROUND

Consumers engage in a variety of transactions, for example, by using financial institutions such as banks. For example, transactions can include a deposit of funds, the use of credit cards, a status check on bank balances, and so on. It would be beneficial to provide financial health advice to consumers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document. Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The techniques described herein solve various technical problems such as analyzing large amounts of financial data to automatically provide for consumer-focused financial health advising. As used herein, the term financial health advising refers to non-investment advising related to improving a consumer's spending habits, increasing credit scores, achieving savings goals, paying off one or more loans, and the like. In certain examples, the techniques described herein provide for the analyzing of success "stories" from peers that have achieved similar improvements in financial health and for automatically deriving a set of financial health templates that can be applied to achieve certain desired financial health goals, e.g., increasing a credit score by a certain amount, provisioning an emergency fund in a certain time range, paying off a mortgage before a certain time, and so on.

In some examples, artificial intelligence techniques, such as machine learning techniques, rule extraction techniques, state vector machines, and the like, can derive a set of patterns during the analysis of the success stories to provide financial guidance as to how to achieve a desired financial health goal, e.g., improve a credit score by 40 points. The set of patterns can then be stored as part of the financial health templates and used to provide focused advice to a consumer that is based on peer experience and actual histories of success.

The financial advice can include ongoing monitoring of transactions, such as monitoring spending, and alerting the user to keep spending within certain limits. Alerts can include geographic-based alerts, such as when a user enters a location such as a mall, a restaurant, a store, and so on, that provide guidance as to spending limits, sales available at the location. Financial health sponsors, such as financial institutions, retailers, manufacturers, and the like, can participate by providing incentives, product offerings, and discounts, thus adding spending flexibility and aiding the consumer in realizing the consumer's financial health goal.

Figure 1:
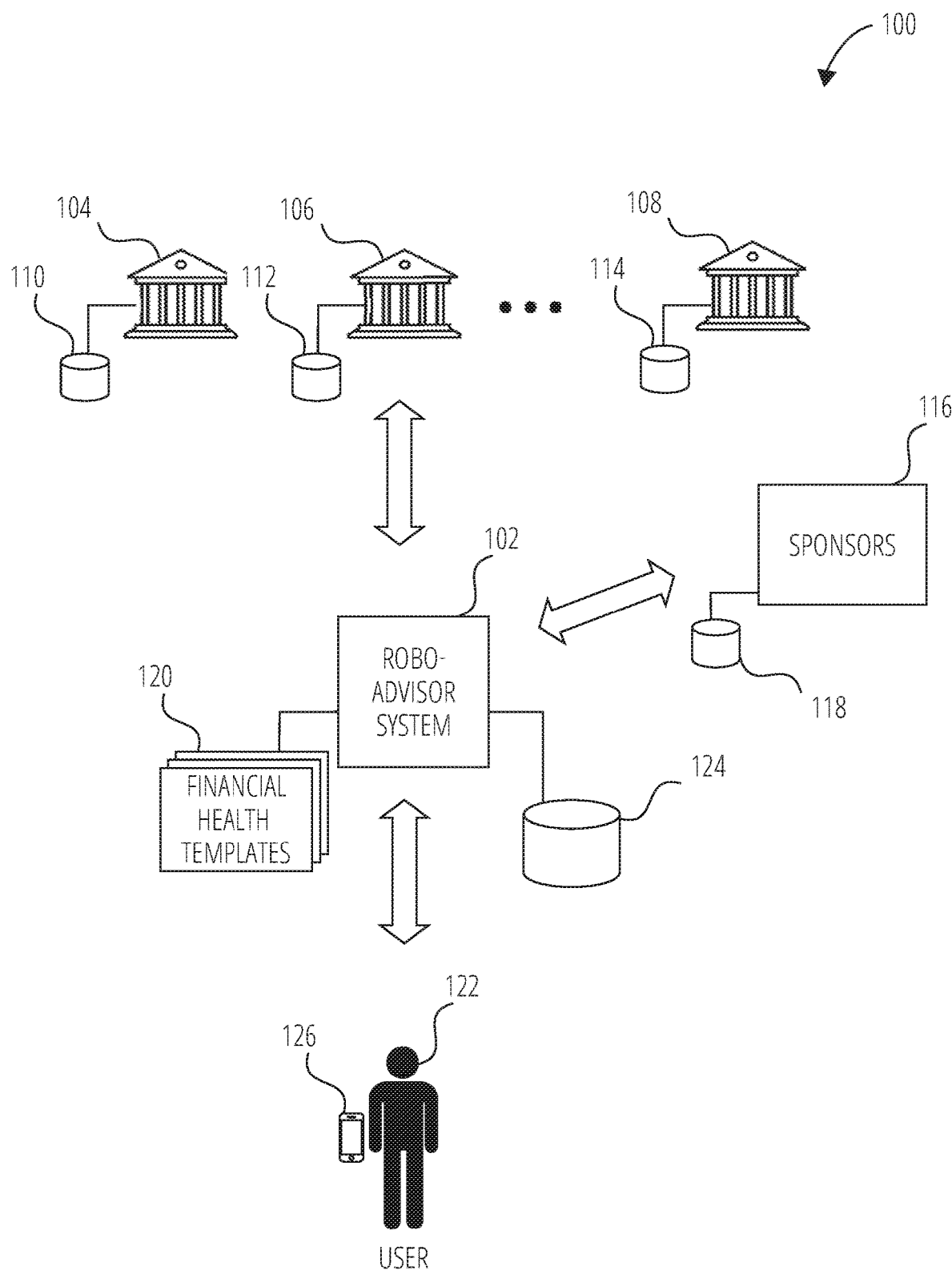
FIG. 1 is a block diagram illustrating a financial system including a financial health robo-advisor system, in accordance with certain examples.

Turning now to FIG. 1, the figure is a block diagram of a financial system 100 having robo-advisor system 102, according to certain examples. In the depicted embodiment, the robo-advisor system 102 is communicatively coupled to financial institutions 104, 106, 108. The financial institutions 104, 106, 108 can include banks, lending institutions, credit card companies, insurance companies, credit unions, and the like, that provide financial services, financial products, and consumer-based financial accounts (e.g., checking accounts, savings accounts). Accordingly, each financial institution includes data stores 110, 112, 114 that are used to process and store financial transactions such as purchases, loan repayments, checking account transactions, savings account transactions, insurance payments, and in general, consumer financial transactions.

The robo-advisor system 102 is also communicatively coupled to one or more sponsors 116. The sponsors 116 include organizations such as retailers, malls, restaurants, manufacturers, banks, stores, and the like, that offer consumer products, including financial products. The sponsors may provide for product offerings, sales, discounts, incentives, promotions, and the like, useful in providing spending flexibility. Data stores 118 may be used by the sponsors 116 to store product offering information, sales information, discounts information, the incentives, the promotions, demographic information on sales (e.g., age, gender, marital status, number of children), products sold by time of year, response rates to certain sales, discounts, incentives, and so on.

The robo-advisor system 102 includes or is operatively coupled to one or more financial health templates 120. The financial health templates 120 may be derived from data stored in the data stores 110, 112, 114, 118 and are used by the robo-advisor system 102 to provide certain financial health advice. In certain examples, the financial health templates 120 are derived based on "peer" success stories. As used herein, peer success stories refer to one or more financial transactions that led to a desired financial goal. For example, a peer, such as an individual consumer, a couple, or a group of individuals, may have successfully achieved certain financial health goals by consolidating debt, creating a payment plan, lowering spending, and the like. The financial health goals include increasing a credit score value, achieving a percent reduction in discretionary spending, achieving a percent reduction in total spending, a percent reduction in a category of spending (e.g., entertainment, travel, home furnishings, clothing, shoes, groceries, rent, utilities), reaching a savings goal amount at a certain time range, creating an emergency fund at a certain amount, repaying a loan by a certain time, and so on.

Accordingly, one or more success metrics based on the financial health goals are used to create and to filter the financial health templates 120. The success metric includes a type of success metric, e.g., an increase in credit score value metric, a percent reduction in discretionary spending metric, a percent reduction in total spending metric, a percent reduction in a category of spending metric, a savings goal amount metric, an emergency fund amount metric, a repayment of a loan amount metric, and so on. The success metric also includes a value, e.g., increase the credit score value by 40 points, 20% reduction in discretionary spending, a 10% percent reduction in total spending, a 5% percent reduction in an entertainment spending, a savings goal of $50,000, an emergency fund amount of $10,000, a repayment of a $30,000 car loan, and so on. The success metric additionally includes a time value, e.g., 2 years to achieve the financial health goal, and can include a peer metric.

The peer metric is used to match a user 122 of the robo-advisor system 102 with similar peers. For example, the peer metric includes an income range (e.g., $50,000 to $80,000), a net worth range (e.g., $25,000-$40,000), an age range (e.g., 25-30), a credit score range, a credit card debt range, a mortgage debt range, an asset debt range (e.g., a car asset), a total debt range, a gender, a home geographic area (e.g., a state, a city, a neighborhood), a number of children, a number of pets, a race, or the like. It is to be noted that the values of the success metric and the peer metric can be left blank. For example, the user 122 can decide to select the increase in credit score value metric and not enter any values, including values for the peer metric. The robo-advisor system 102 will then select all financial health templates 120 that include the increase in credit score value metric without filtering for specific values. Multiple success metrics can also be used, such as when the user 122 desires to combine both an increase in credit score value metric with a reduction in discretionary spending.

Each financial health template 120 can be created based on peer success stories to achieve one or more financial health goals via a financial plan. For example, a peer having an income range of between $50,000 to $60,000 and a credit score of between 525 and 550 was able was able to increase their credit score 40 points by following certain financial transactions (e.g., the peer success story), such as consolidating debt into a single loan and reducing discretionary spending to meet the single loan obligations over a certain time range (e.g., 2 years).

In some examples, the financial plan for the financial health template is created automatically. For example, consumers can volunteer to have their transactional data stored in the data store 124 in an anonymized format. The anonymized format removes identifying information, such as names, driver's licenses, social security information, and so on, per applicable rules and regulations and stored in the data store 124. The anonymized data store 124 is then analyzed to find peer success stories based on user selected financial goals. For example, financial transaction histories (e.g., a list of financial transactions through a given time range, e.g., 4 years) can be identified that led to the desired financial goals, e.g., the increase in credit score value, the percent reduction in discretionary spending, the percent reduction in total spending, the percent reduction in a category of spending, the savings goal amount, the emergency fund amount, and/or the repayment of a loan amount. That is, the anonymized transactional data can be automatically searched to find peer success stories where a financial goal was reached. The financial transactional data identified can then be further processed to retrieve one or more success metrics and their corresponding values, as well as one or more peer metrics.

Each financial transactional data identified can include various financial transaction types, such as a debt consolidation, a transfer of an account balance, a refinancing, a withdrawal of home equity, a selling of an asset, a purchase of an asset, taking out a loan, setting up of an automatic payment, a creation of a payment plan, making a payment at a certain schedule, maintaining an account balance at a certain amount, and so on. Artificial intelligence (AI) techniques, such as machine learning, deep learning, state vector machines, and the like, can find patterns among the various financial transactional data that include the desired success metric. The robo-advisor system 102 can train, for example, one or more neural networks to filter common patterns (e.g., financial success patterns) found in financial transactional data of consumers who volunteered their data, that include the success metrics. As mentioned earlier, the financial success patterns can be further linked to consumers who have certain characteristics, such as income range (e.g., $50,000 to $80,000), net worth range (e.g., $25,000-$40,000), age range (e.g., 25-30), credit score range, credit card debt range, mortgage debt range, asset debt range (e.g., a car asset), total debt range, gender, home geographic area (e.g., a state, a city, a neighborhood), number of children, number of pets, and race. The resulting extracted patterns and links to consumer characteristics (e.g., peer metric values) are then stored as the financial health templates 120. Accordingly, each financial health template 120 includes one or more financial success patterns, and one or more success metrics, and one or more peer metrics for the peer(s) that reached the success metric(s).

The user 122 can then enter into the robo-advisor system 102 GUI a financial health goal and the robo-advisor system 102 can search the one or more financial health templates 120 to find financial health templates 120 that match the selected financial health goals. The financial plans included in the matched financial health templates 120 are then presented, and the user 122 is provided with the ability to enter certain customizations. For example, the user 122 can modify the financial plans to account for more or less "belt tightening" based on their individual preferences. For example, if the financial plan includes advice to create automatic deposits of an amount X, the user 122 can change the amount to account for their preferences. A financial health plan can include a number of suggested financial transactions, such undergoing debt consolidation, transferring an account balance to a different account, refinancing a loan, withdrawing home equity to pay for remodeling, a selling of an asset, a purchase of an asset, taking out a loan at lower interest rates to pay off a higher interest rate loan, setting up of an automatic payment, creating of a payment plan (e.g., loan payment plan, emergency fund payment plan), making a payment at a certain schedule (e.g., using the "snowball" method to pay off debts from smallest to largest, using the "avalanche" method to pay the debt with highest interest rate first), maintaining an account balance at a certain amount by setting spending limits, and so on.

Once the user customizes a financial health plan, the robo-advisor system 102 can aid in the execution of the financial health plan via monitoring, alerting, and automatic execution of certain financial health transactions. For example, the robo-advisor system 102 can also apply artificial intelligence techniques to derive certain occurrences or patterns based on financial transactions for the user 122 that are geotagged. For example, the robo-advisor system 102 can detect that when the user 122 enters a certain geographic area, e.g., a mall, a restaurant, a store, and the like, there is a probability (e.g., probability greater than a customizable probability value, such as 10%) that the user 122 will make purchases at the geographic area. The robo-advisor system 102 monitoring geographical data can then alert the user 122 that spending over a certain limit would exceed spending limits in the financial health plan before the spending occurs, thus providing for notifications that enable the user 122 to improve their financial health. Notifications (e.g., push notifications, pull notifications), alerts, geofencing, and GUI interfaces may be provided by using computing systems such as a mobile device 126, smartwatches, tablets, laptops, websites, and so on.

The robo-advisor system 102 can also provide for the execution of the financial health plan, for example, by scheduling automatic payments to fund certain accounts (e.g., emergency fund account, future asset purchase account), to transfer funds from a first account to second account, to pay certain entities (e.g., insurance payments, asset loan consolidation payments, credit car payments, other loan payments), to follow certain debt reduction strategies (e.g., the snowball method, the avalanche method), and the like. Progress of the financial health plan can also be monitored by the robo-advisor system 102, and updates provided. For example, as credit scores rise, progress indicators may use colors to go from red to yellow to green. Likewise, as payments are made and loan balances are reduced, progress indicators may show visuals such as different colors, progress bars increasing towards an end goal, celebratory animations, and the like.

The sponsors 116 are communicatively coupled to the robo-advisor system 102, for example, to aid the consumer reaching a financial health goal. For example, if the user 122 enters a geographic area where the user 122 typically buys certain items, the sponsors 116 can identify lower cost items or items on sale, and provide alerts notifying the user 122. The sponsors 116 can also participate during the user's customization of the financial health plan, such as by offering products, including financial products (e.g., mortgage refinancing, new loans at lower rates), that can enhance the user's ability to reach the desired financial health goals. In this manner, the techniques described herein provide for improved financial flexibility and focus automatic advising for consumer financial health. It is to be noted that the robo-advisor system 102 can ignore investing, and advises without considering investing. That is, the robo-advisor system 102 does not use investing as an input or output.

Figure 2:
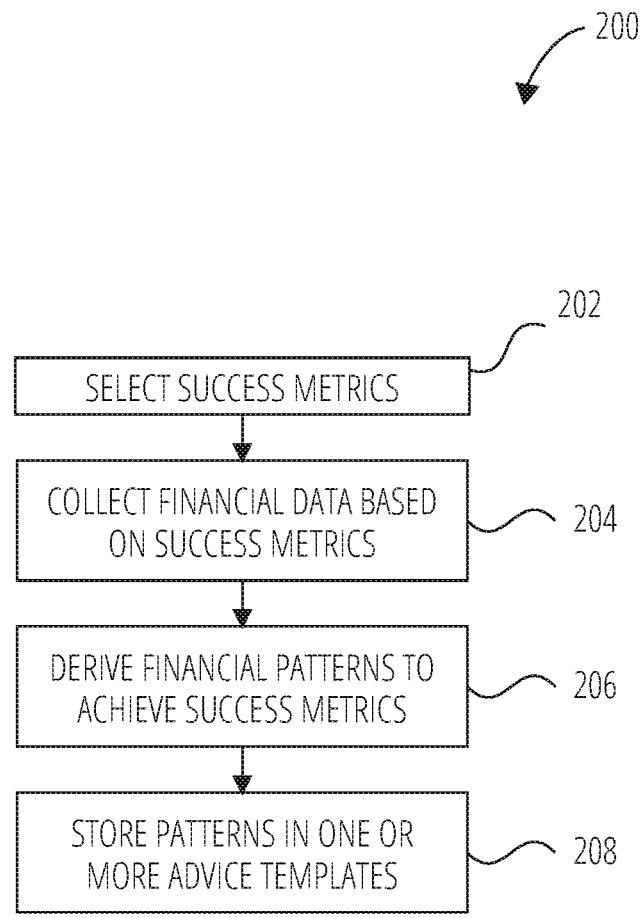
FIG. 2 is a flowchart of a process for creating financial health templates, in accordance with certain examples.

It may be beneficial to describe some example processes that can be performed via the robo-advisor system 102 or other systems, suitable for enhancing the financial health of the user 122. Turning now to FIG. 2, the figure is a flowchart illustrating a process 200 suitable for creating the financial health templates 120, according to certain examples. In the depicted embodiment, the process 200 selects, at block 202, one or more success metrics to be included in one of the financial health templates 120. As mentioned earlier, success metrics include a type of success metric, e.g., an increase in credit score value metric, a percent reduction in discretionary spending metric, a percent reduction in total spending metric, a percent reduction in a category of spending metric, a savings goal amount metric, an emergency fund amount metric, a repayment of a loan amount metric, or a combination thereof. The success metric also includes a value, e.g., increase the credit score value by 40 points, 20% reduction in discretionary spending, a 10% percent reduction in total spending, a 5% percent reduction in an entertainment spending, a savings goal of $50,000, an emergency fund amount of $10,000, a repayment of a $30,000 car loan, and so on. The success metric additionally includes a time value, e.g., 2 years to achieve the financial health goal, and a peer metric.

The peer metric is used to match characteristics of users with characteristics of peers that have successfully reached a financial health goal. For example, the peer metric includes an income range (e.g., $50,000 to $80,000), a net worth range (e.g., $25,000-$40,000), an age range (e.g., 25-30), a credit score range, a credit card debt range, a mortgage debt range, an asset debt range (e.g., a car asset), a total debt range, a gender, a home geographic area (e.g., a state, a city, a neighborhood), number of children, number of pets, and a race. Multiple success metrics can be used to create a single financial health template 120.

The process 200 collects, at block 204, financial information based on the success metrics selected, e.g., based on the success metric type selected. The financial information is collected by querying anonymized consumer data, such as financial transactions that have been anonymized and stored in the data store 124 to remove identifying information so as to comply with jurisdictional laws and regulations for anonymized data. The anonymized data is collected by filtering financial transactions based on the success metrics selected so as to find transactional histories that include the desired success metrics.

The process 200 then derives, at block 206, one or more financial health patterns from the collected financial data. For example, AI techniques, such as machine learning, deep learning, state vector machines, data mining techniques, and the like, can find financial patterns among the various transaction histories for one or more consumers that include the selected success metric. For example, models, such as neural network models, can be trained to identify the financial patterns and then used to extract rules, such as by using rule extraction via back propagation, deep belief, differential evolution (DE), and/or touring ant colonization (TACO) techniques. The extracted rules can be in an "IF . . . THEN . . . " format, such as "IF credit score <550 THEN reduce_debt_by=10% AND keep_credit_debt_under=$10,000." Other rule extraction techniques can also be used to train models, such as data mining rule extraction techniques that incorporate rules extraction systems (RULES) (e.g., inductive learning systems), including Waikato Environment for Knowledge Analysis (Weka) techniques, KEEL (Knowledge Extraction based on Evolutionary Learning) techniques, and the like, that result in trained data mining models. As mentioned earlier, the financial success patterns can be further linked to consumers who have certain characteristics, such as income range (e.g., $50,000 to $80,000), net worth range (e.g., $25,000-$40,000), age range (e.g., 25-30), credit score range, credit card debt range, mortgage debt range, asset debt range (e.g., a car asset), total debt range, gender, home geographic area (e.g., a state, a city, a neighborhood), number of children, number of pets, and race by creating equivalent peer metrics. The resulting patterns (e.g., extracted rules) and links to consumer characteristics (e.g., peer metric values) are then stored, at block 208, as the financial health templates 120.

Figure 3:
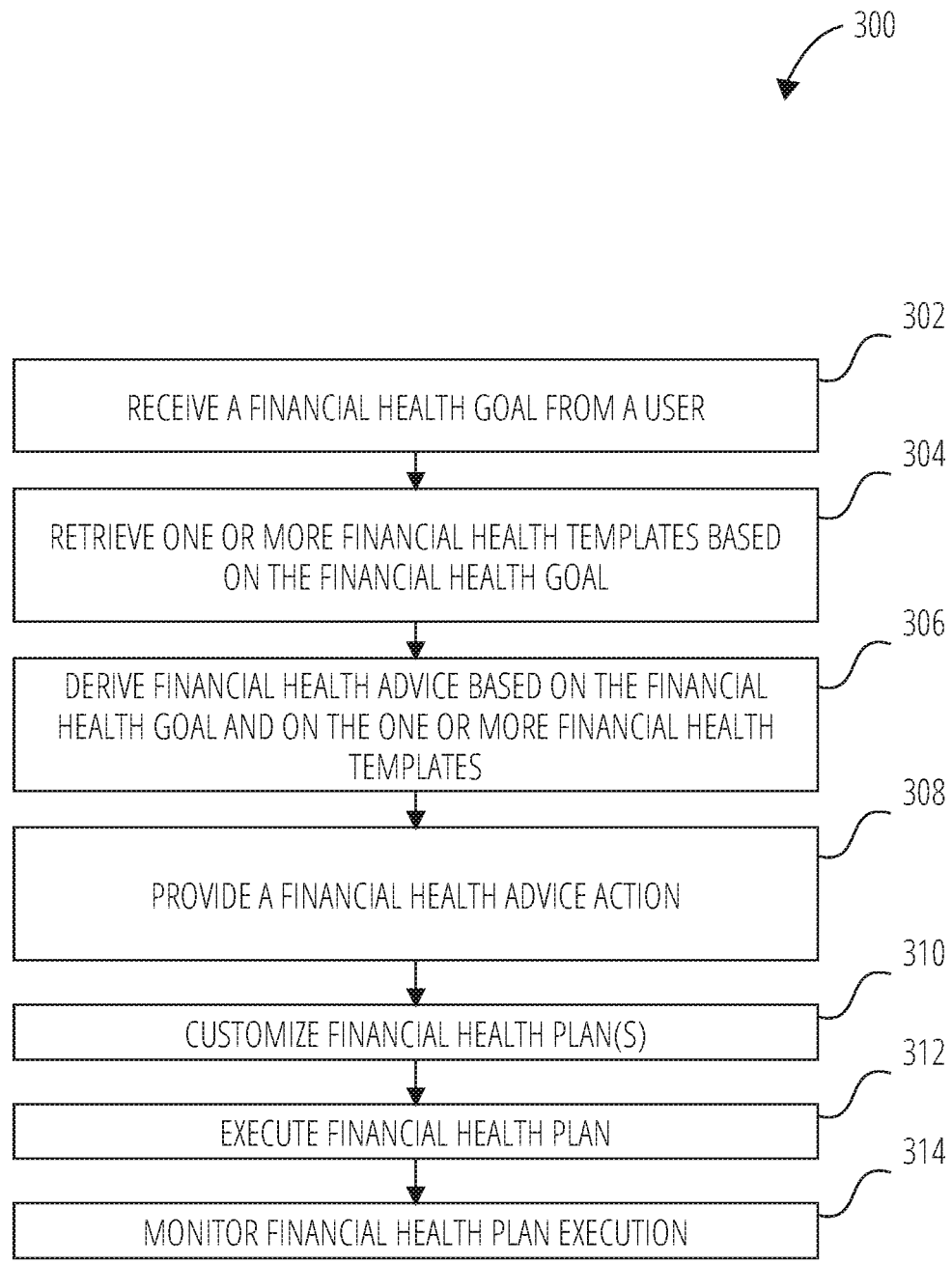
FIG. 3 is a flowchart of a process for automatically providing financial health advice, in accordance with certain examples.

A process, such as a process 300 depicted in FIG. 3, is used to provide financial health advice, according to some examples. In the depicted embodiment, a system, such as the robo-advisor system 102, receives, at block 302, a non-investing financial health goal from the user 122. The financial health goal can include increasing a credit score, reducing a discretionary spending, reducing a total spending, reducing a category of spending, achieving a savings goal amount, creating an emergency fund, repaying a loan, or a combination thereof.

The process 300 then retrieves, at block 304, one or more financial templates, such as the financial templates created by process 200, based on the financial health goal received from the user. For example, if the health goal includes increasing a credit score, the process 300 searches a data store, such as the data store 124, for financial health templates 120 that include the increase in credit score value metric. Multiple success metrics can be used to retrieve the financial health templates 120, such as the percent reduction in discretionary spending metric, the percent reduction in total spending metric, the percent reduction in a category of spending metric, the savings goal amount metric, the emergency fund amount metric, and the repayment of a loan amount metric, or a combination thereof. Each financial template includes one or more trained models, e.g., AI models that have been trained by various AI techniques, e.g., deep learning via neural networks, data mining rule extraction, and so on.

Additionally, the user can provide details about themselves along with the financial health goal, such income, net worth, age, credit score, credit card debt, mortgage information, asset debts, total debt, gender, home geographic area (e.g., a state, a city, a neighborhood), number of children, number of pets, and race. In some examples, the user's details can be used to further filter the financial health templates 120 by applying, at the user's direction, certain of the user details via peer metric searches of the financial health templates 120. For example, the user details are applied by searching for matching financial health templates 120 that include peer metrics having the user's selected details, e.g., an income range between $50,000 to $80,000, a net worth between 25,000-$40,000, an age range between 25-30, a credit score range between 550-600, a credit card debt range between $10,000-$15,000, and so on.

The process 300 then derives, at block 306, financial health advice (e.g., one or more actions to perform) based on the financial health templates retrieved and the financial health goal. For example, each financial health template includes one or more financial plans that have been extracted (e.g., via AI techniques) from transactional histories (e.g., peer success stories) that included certain success metrics. The financial plans include financial transactions such as debt consolidation, a transfer of an account balance, a refinancing, a withdrawal of home equity, a selling of an asset, a purchase of an asset, taking out a loan, setting up of an automatic payment, a creation of a payment plan, making a payment at a certain schedule, maintaining an account balance at a certain amount, or a combination thereof. In some examples, the extracted financial plans are automatically presented as part of the financial health advice. In certain examples, the financial plans can be modified by financial professionals, such as employees or consultants of the financial institutions 104, 106, 108, before being presented to the user or modified with the user as part of a user consultation session.

Accordingly, the financial plans are presented, at block 308, as part of the financial advice action(s). The financial advice actions can also include expert advice and financial plans stored in the data store 124 and created by financial professionals, such as employees or consultants of the financial institutions 104, 106, 108. The user 122 can customize, at block 310, the financial health plan(s), for example, by modifying values for the financial transactions in the plan, such as a desired debt consolidation amount, an amount to transfer from one account to another account, a refinancing amount, a withdrawal of home equity amount, a selling of an asset amount, a purchase of an asset amount, a loan amount, a schedule and an amount for an automatic payment, modifying a schedule and an amount for a payment plan, an amount to maintain for certain account balances, or a combination thereof. The user can also remove or add certain financial transactions from the plan based on their preferences, including "belt tightening" preferences.

The process 300 then executes, at block 312, the resulting financial plan, e.g., via the action(s). For example, the robo-advisor system 102 may be communicatively and/or operatively coupled to various information technology (IT) systems as well as the data stores 110, 112, 114 included in the financial institutions 104, 106, 108, to process payments, set up payment schedules, move balances from one account to another account, enter new loan information, solicit loan bids from various vendors, and so on. The process 300 then monitors, at block 314, the plan's execution as further described below with respect to FIG. 4. By providing for techniques that extract financial automatically health advice from peers, the techniques described herein can improve a consumer's ability to achieve desired financial goals.

Figure 4:
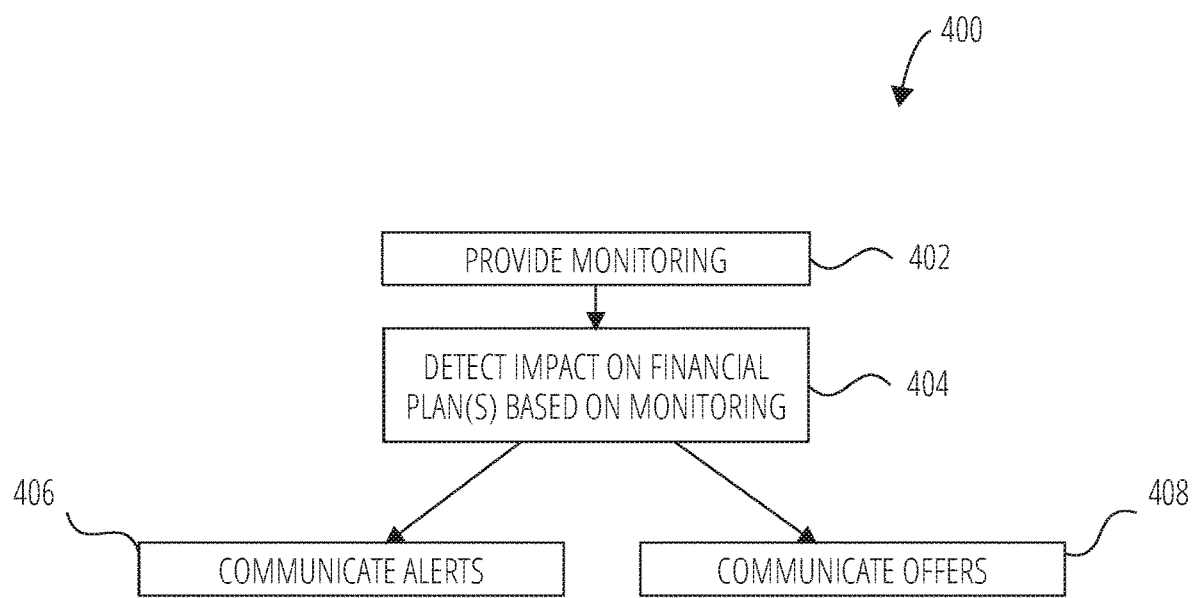
FIG. 4 is a flowchart of a process for monitoring financial health plans, in accordance with certain examples.

Turning now to FIG. 4, the figure is a flowchart illustrating a process 400 used in monitoring execution of the financial health plan, according to certain examples. In the depicted embodiment, a system, such as the robo-advisor system 102, provides, at block 402, monitoring of financial transactions and/or geolocation information. For example, credit card purchases by spending category are monitored, account transfers are monitored, loan payments are monitored, credit card payments are monitored, insurance payments are monitored, and so on, to track the execution of the financial plan by the user 122. The user 122 can also select geographic location monitoring, so that the process 400 detects when the user 122 is at certain locations that may impact the financial plan being executed.

Indeed, the process 400, at block 404, can detect an impact on the user's financial plan based on the monitoring of financial transactions and/or of geographic data. As mentioned earlier, geographic monitoring can be used to determine if the user 122 is about to enter or is entering a mall, a restaurant, a store, or a location that results in user spending. Accordingly, the process 400 applies the financial and/or geographic monitoring to detect if the user 122 is exceeding or is about to exceed certain spending limits, if the user 122 has missed a payment or is otherwise behind on a loan, is behind or is about to be behind in adding an amount to an emergency loan fund, and so on, by comparing current balances, payments processed, and so on, against present spending at the location and/or predicted spending at the location. To determine predictive spending, the process 400 can use pattern analysis, e.g., via AI techniques such as training one or more neural networks to derive shopping patterns at various locations for the user 122, by using transactional histories of the user 122 for the training. The trained neural networks are then used to determine if there is a probability (e.g., greater than a customizable probability value such as 10%) that the user 122 will make a purchase of a good and/or a service at a certain location, and the amount of a typical purchase.

The process 400 can then transmit alerts, at block 406, for example by using push techniques, pull techniques, or a combination thereof, of the impact of the current and/or future spending to the financial health plan. For example, the process 300 can detect overspending, going over a budget, not saving sufficient funds, missing a scheduled payment, not transferring certain balances to another account, and so on, and alert accordingly. The process 400 also communicates, at block 408, the availability of certain offers based on the monitoring. For example, the monitoring can detect that a credit card account is over a certain amount, and a financial product, such as a debt consolidation loan, can then be offered to the user 122. Likewise, when entering a place of business such as a mall, a restaurant, an outdoor market, and so on, offers may be presented, incoming from the sponsors 116, for sales, discounts, purchasing incentives, and so on, that may improve the ability of the user 122 to achieve the desired financial health goal.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems. It is to be noted that processes, e.g., process 200, 300, and 400 described herein may ignore investing, can provide advise without considering investing, or otherwise not use investing as an input or output.

Figure 5:
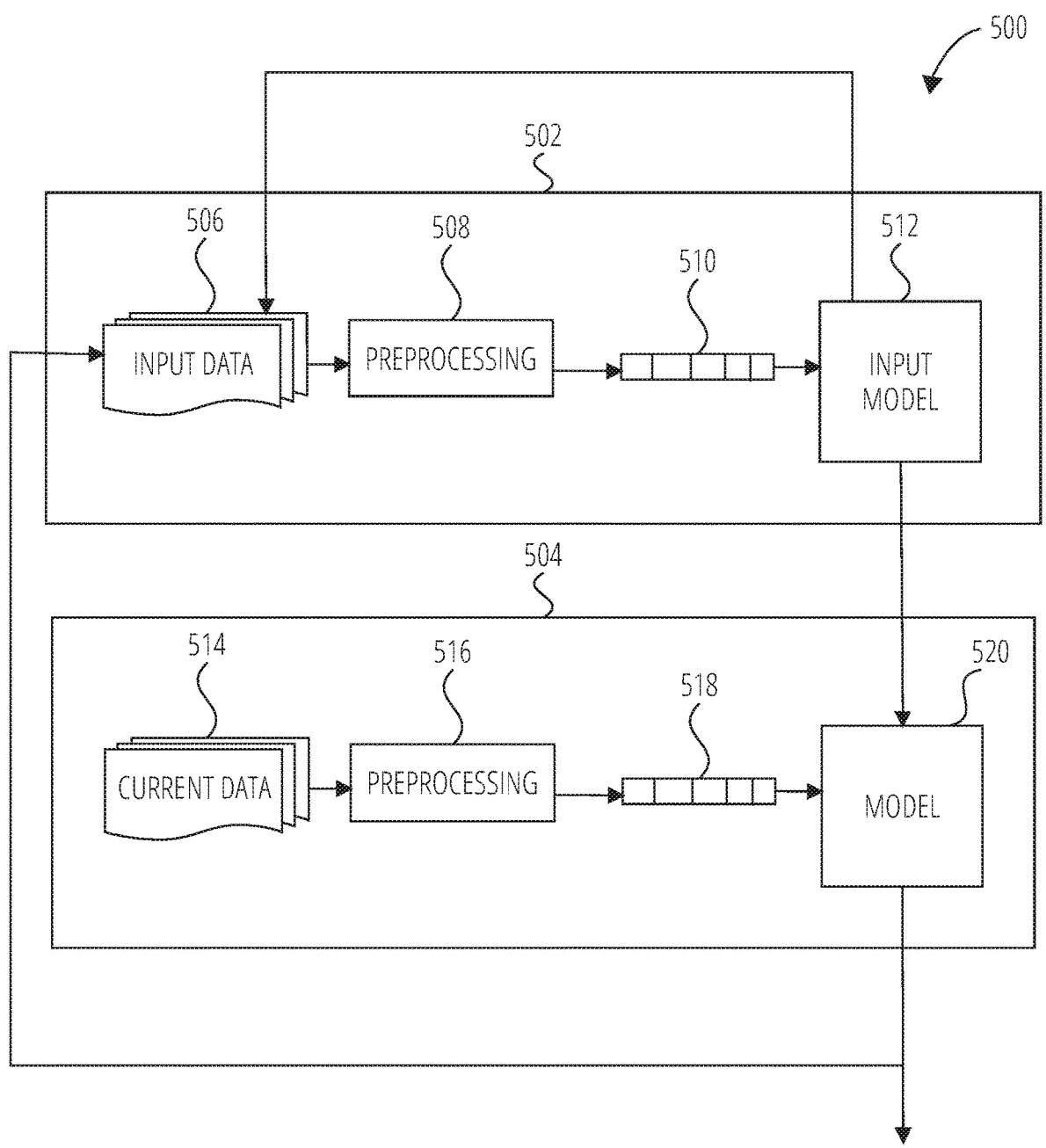
FIG. 5 illustrates an artificial intelligence (AI) learning system, in accordance with certain examples.

FIG. 5 illustrates an artificial intelligence learning engine for the creation of trained models stored in the financial health templates 120, in accordance with some examples. The machine learning engine may be deployed to execute at a mobile device (e.g., a cell phone) or a computer. A system may calculate one or more weightings for criteria based upon one or more machine learning algorithms. FIG. 5 shows an example machine learning engine 500 according to some examples of the present disclosure.

Machine learning engine 500 uses a training engine 502 and a prediction engine 504. Training engine 502 uses input data 506, for example after undergoing preprocessing component 508, to determine one or more features 510. The one or more features 510 may be used to generate an initial model 512, which may be updated iteratively or with future labeled or unlabeled data (e.g., during reinforcement learning).

The input data 506 may include financial information collected by querying anonymized consumer data, such as financial transactions (e.g., financial transaction histories) that have been anonymized and stored in the data store 124 to remove identifying information so as to comply with jurisdictional laws and regulations for anonymized data. Transaction data includes as debt consolidation data, a transfer of an account balance data, a refinancing data, a withdrawal of home equity data, a selling of an asset data, a purchase of an asset data, data from taking out a loan, data from setting up of an automatic payment, data of a creation of a payment plan, making a payment at a certain schedule data, maintaining an account balance at a certain amount, or a combination thereof.

In the prediction engine 504, current data 514 (e.g., a set of the financial transaction data saved for later training) may be input to preprocessing component 516. In some examples, preprocessing component 516 and preprocessing component 508 are the same. The prediction engine 504 produces feature vector 518 from the preprocessed current data, which is input into the model 520 to generate one or more criteria weightings 522. The criteria weightings 522 may be used to output a prediction, as discussed further below.

The training engine 502 may operate in an offline manner to train the model 520 (e.g., on a server). The prediction engine 504 may be designed to operate in an online manner (e.g., in real-time, at a mobile device, on a wearable device, etc.). In some examples, the trained model 520 may be periodically updated via additional training (e.g., via updated input data 506 or based on labeled or unlabeled data output in the weightings 522) or based on identified future data, such as by using reinforcement learning to personalize a general model (e.g., the initial model 512) to a particular user.

The initial model 512 may be updated using further input data 406 until a satisfactory model 520 is generated. The trained model 520 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 502 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 502. In an example embodiment, a regression model is used and the model 520 is a vector of coefficients corresponding to a learned importance for each of the features in the vector of features 510, 518. A reinforcement learning model may use Q-Learning, a deep Q network, a Monte Carlo technique including policy evaluation and policy improvement, a State-Action-Reward-State-Action (SARSA), a Deep Deterministic Policy Gradient (DDPG), or the like. Once trained, the model 520 may output a financial plan (e.g., a set of financial transactions) that meets a desired financial health goal.

Figure 6:
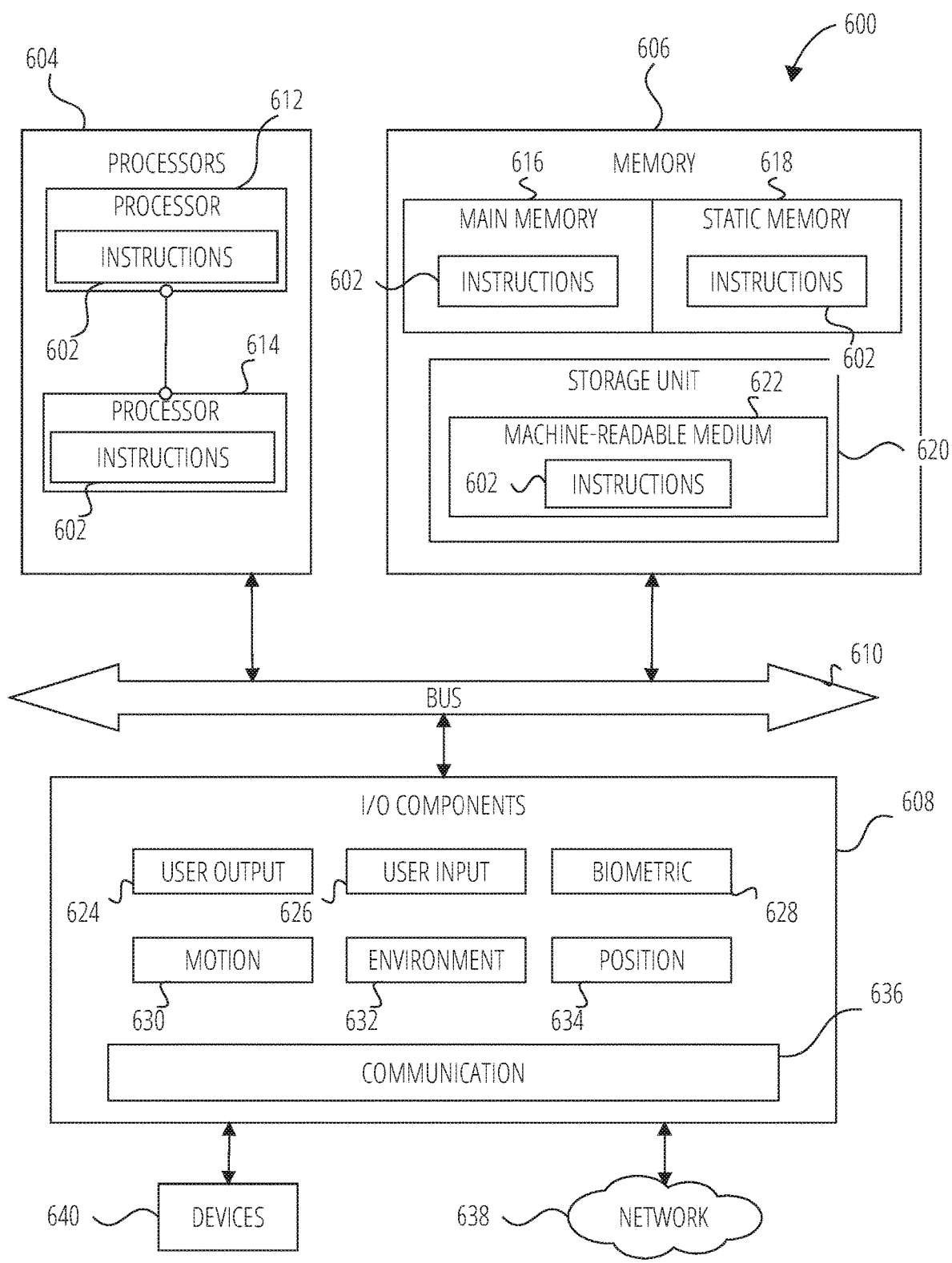
FIG. 6 is a block diagram depicting a machine suitable for executing instructions via one or more processors, in accordance with certain examples.

FIG. 6 is a diagrammatic representation of a machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the processes or methods described herein, such as the process 200, 300, and 400. The instructions 602 transform the general, non-programmed machine 600 into a particular machine 600, e.g., the robo-advisor system 102, programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 616, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 634 include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a universal serial bus (USB) port), internet-of-things (IoT) devices, and the like.

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

The techniques described herein provide for analyzing large amounts of financial data to automatically provide for focused financial health advising. Financial health templates are created based on the financial data analysis, that include financial plans for reaching desired goals related to improving a consumer's spending habits, increasing credit scores, achieving savings goals, paying off one or more loans, and the like. In certain examples, the techniques described herein analyze financial data from consumer peers that have achieved similar improvements in financial health, thus improving the chances that a user can reach a desired financial goal.

What is claimed is:

1. A method, comprising:
receiving, via a processor, a financial health goal from a user, wherein the financial health goal does not include an investment goal;
retrieving, from a data store, one or more financial health templates based on the financial health goal, wherein each of the one or more financial health templates comprise a trained artificial intelligence (AI) model having one or more neural networks trained from a dataset of anonymized peer financial transaction histories using a selected training algorithm, wherein the trained AI model is trained to identify one or more success patterns in the peer financial transaction histories that are predictive of achieving one or more specific financial health goals by training, via the processor, the one or more neural networks based on the selected training algorithm by providing the dataset of anonymized peer financial transaction histories as training input to the one or more neural networks;
deriving, via the processor, a financial health advice action based on using the financial health goal as input to the trained AI model of the one or more financial health templates, wherein the trained AI model is configured to identify the one or more success patterns based on the financial health goal, wherein the financial health goal comprises increasing a credit score, reducing a discretionary spending, reducing a total spending, reducing a category of spending, achieving a savings goal amount, creating an emergency fund, repaying a loan, or a combination thereof;
providing, via the processor, the financial health advice action, wherein the one or more financial health templates are created based on consumer financial data;
monitoring, via a financial network, financial transactions of a user of the financial health advice action;
determining, via the processor, that one or more of the financial transactions are not following the financial health advice action; and
alerting, via the processor, the user that the financial health advice action is not being followed based on the determination, wherein the one or more financial health templates are created, via the processor, by:
selecting a success metric;
collecting the consumer financial data related to the success metric;
deriving one or more financial success patterns from the consumer financial data by training the trained AI model; and
storing the one or more financial success patterns as the trained AI model of the one or more financial health templates, wherein deriving the one or more financial success patterns from the consumer financial data by training the trained AI model based on the selected training algorithm comprises applying machine learning, deep learning, state vector machines, data mining, or a combination thereof, to extract the one or more financial success patterns from the consumer financial data, and wherein applying machine learning, deep learning, state vector machines, data mining, or the combination thereof, comprises creating the one or more neural networks and training the one or more neural networks to detect the one or more financial success patterns, extracting rules via data mining rule extraction, or a combination thereof.

2. The method of claim 1, wherein the success metric comprises an increase in credit score value metric, a percent reduction in discretionary spending metric, a percent reduction in total spending metric, a percent reduction in a category of spending metric, a savings goal amount metric, an emergency fund amount metric, a repayment of a loan amount metric, or a combination thereof.

3. The method of claim 1, wherein collecting the consumer financial data related to the success metric comprises searching anonymized data in the data store based on the selected success metric.

4. The method of claim 1, wherein providing the financial health advice action comprises presenting a financial health plan comprising one or more financial transactions.

5. The method of claim 4, wherein the one or more financial transactions comprise a debt consolidation, a transfer of an account balance, a refinancing, a withdrawal of home equity, a selling of an asset, a purchase of an asset, taking out a loan, setting up of an automatic payment, a creation of a payment plan, making a payment at a certain schedule, maintaining an account balance at a certain amount, or a combination thereof.

6. The method of claim 1, comprising receiving, via the processor, a customization data to customize a financial health plan included in the financial health advice.

7. The method of claim 6, wherein the customization data comprises a modified value for: a debt consolidation amount, an amount to transfer from one account to another account, a refinancing amount, a withdrawal of home equity amount, a selling of an asset amount, a purchase of an asset amount, a loan amount, an amount for an automatic payment, an amount for a payment plan, an amount to maintain an account balance, or a combination thereof.

8. The method of claim 6, comprising executing, via the processor, the financial health plan by processing a payment, setting up payment schedule, moving a balance from a first account into a second account, entering new loan information, soliciting a loan bid, or a combination thereof.

9. The method of claim 8, comprising monitoring execution of the financial health plan by monitoring financial transactions, monitoring geographic data, or a combination thereof.

10. The method of claim 9, wherein monitoring geographic data comprises determining that the user is at a location where the user has a probability exceeding a customized probability value of purchasing a good or a service.

11. The method of claim 9, comprising alerting the user when the monitoring of financial transactions, the monitoring of geographic data, or the combination thereof, determines that a purchase will exceed a purchase limit included in the financial health plan.

12. The method of claim 9, comprising offering a product or a service based on the monitoring of financial transactions, the monitoring of geographic data, or the combination thereof.

13. The method of claim 1, wherein the financial health goal comprises increasing a credit score, reducing a discretionary spending, reducing a total spending, reducing a category of spending, achieving a savings goal amount, creating an emergency fund, repaying a loan, or a combination thereof.

14. A non-transitory machine-readable medium storing instructions that,
when executed by a computer system, cause the computer system to perform operations comprising:
receiving a financial health goal from a user wherein the financial health goal does not include an investment goal;
retrieving, from a data store, one or more financial health templates based on the financial health goal, wherein each of the one or more financial health templates comprise a trained artificial intelligence (AI) model having one or more neural networks trained from a dataset of anonymized peer financial transaction histories using a selected training algorithm wherein the trained AI model is trained to identify one or more success patterns in the peer financial transaction histories that are predictive of achieving one or more specific financial health goals by training the one or more neural networks based on the selected training algorithm by providing the dataset of anonymized peer financial transaction histories as training input to the one or more neural networks;
deriving a financial health advice action based on using the financial health goal as input to the trained model of the one or more financial health templates, wherein the trained AI model is configured to identify the one or more success patterns based on the financial health goal, wherein the financial health goal comprises increasing a credit score, reducing a discretionary spending, reducing a total spending, reducing a category of spending, achieving a savings goal amount, creating an emergency fund, repaying a loan, or a combination thereof;
providing the financial health advice, wherein the one or more financial health templates are created based on consumer financial data;
monitoring financial transactions of a user of the financial health advice action;
determining that one or more of the financial transactions are not following the financial health advice action; and
alerting the user that the financial health advice action is not being followed based on the determination, wherein the one or more financial health templates are created by:
selecting a success metric;
collecting the consumer financial data related to the success metric;
deriving one or more financial success patterns from the consumer financial data by training the trained AI model; and
storing the one or more financial success patterns as the trained AI model of the one or more financial health templates, wherein deriving the one or more financial success patterns from the consumer financial data by training the trained AI model based on the selected training algorithm comprises applying machine learning, deep learning, state vector machines, data mining, or a combination thereof, to extract the one or more financial success patterns from the consumer financial data, and wherein applying machine learning, deep learning, state vector machines, data mining, or the combination thereof, comprises creating the one or more neural networks and training the one or more neural networks to detect the one or more financial success patterns, extracting rules via data mining rule extraction, or a combination thereof.

15. A system, comprising:
a robo-advisor system configured to:
receive a financial health goal from a user, wherein the financial health goal does not include an investment goal;
retrieve, from a data store, one or more financial health templates based on the financial health goal, wherein each of the one or more financial health templates comprise a trained artificial intelligence (AI) model having one or more neural networks trained from a dataset of anonymized peer financial transaction histories using a selected training algorithm, wherein the trained AI model is trained to identify one or more success patterns in the peer financial transaction histories that are predictive of achieving one or more specific financial health goals by training the one or more neural networks based on the selected training algorithm by providing the dataset of anonymized peer financial transaction histories as training input to the one or more neural networks;

derive a financial health advice action based on using the financial health goal as input to the trained model of the one or more financial health templates, wherein the trained AI model is configured to identify the one or more success patterns based on the financial health goal, wherein the financial health goal comprises increasing a credit score, reducing a discretionary spending, reducing a total spending, reducing a category of spending, achieving a savings goal amount, creating an emergency fund, repaying a loan, or a combination thereof;

provide the financial health advice, wherein the one or more financial health templates are created based on consumer financial data;

monitor financial transactions of a user of the financial health advice action;

determine that one or more of the financial transactions are not following the financial health advice action; and alert the user that the financial health advice action is not being followed based on the determination, wherein the one or more financial health templates are created by:

selecting a success metric;

collecting the consumer financial data related to the success metric;

deriving one or more financial success patterns from the consumer financial data by training the trained AI model; and storing the one or more financial success patterns as the trained AI model of the one or more financial health templates, wherein deriving the one or more financial success patterns from the consumer financial data by training the trained AI model based on the selected training algorithm comprises applying machine learning, deep learning, state vector machines, data mining, or a combination thereof, to extract the one or more financial success patterns from the consumer financial data, and wherein applying machine learning, deep learning, state vector machines, data mining, or the combination thereof, comprises creating the one or more neural networks and training the one or more neural networks to detect the one or more financial success patterns, extracting rules via data mining rule extraction, or a combination thereof.

* * * * *